3,542,878
ALDOL CONDENSATION PROCESS

Harold E. Swift, Gibsonia, Pa., assignor to Gulf Research & Development Company, Pittsburgh, Pa., a corporation of Delaware
No Drawing. Continuation-in-part of application Ser. No. 506,479, Nov. 5, 1965. This application Nov. 22, 1967, Ser. No. 684,948
Int. Cl. C07c 45/10, 49/06, 47/02
U.S. Cl. 260—586             13 Claims

ABSTRACT OF THE DISCLOSURE

A process for the aldol condensation of carbonyl compounds using a supported tin catalyst at elevated temperatures.

---

This application is a continuation-in-part of U.S. Ser. No. 506,479, filed Nov. 5, 1965, now abandoned.

This invention relates to a process for condensing carbonyl compounds in the presence of tin, preferably metallic tin, at elevated temperatures to produce carbonyl compounds of increased molecular weight. As used herein, the expression carbonyl compounds means aldehydes and ketones.

The aldol condensation process is a well known process for increasing the carbon chain length of carbonyl compounds. It is used for the condensation of the same compound or for the condensation of a mixture of compounds. Since the condensation reaction involves the transfer of an alpha hydrogen atom from one molecule to the carbonyl group of another molecule, at least one of the carbonyl compounds must have at least one alpha hydrogen atom. If there is only one alpha hydrogen atom, the condensed molecule contains a hydroxy group in the beta position. If more than one alpha hydrogen atoms are present, the condensed product can readily be dehydrated to form the conjugated alpha, beta unsaturated carbonyl compound, or it will form the conjugated alpha, beta unsaturated carbonyl compound during the condensation reaction when the reaction conditions favor this dehydrogenation reaction.

In the commonly used process for aldol condensation sodium hydroxide serves as the catalyst. This process is not completely satisfactory since significant quantities of undesired by-products including higher molecular weight polymers are also formed. Furthermore, disposal of substantial quantities of the spent caustic-organic contaminants mixture presents a substantial problem. Chemically treating the spent caustic is expensive while dumping this caustic in rivers or streams is intolerable in a modern civilization conscious of the damages suffered by industrial pollution.

I have unexpectedly found that aldol condensation of carbonyl compounds can readily and conveniently be undertaken with high selectivity and yields to the desired condensation product by utilizing a tin, preferably metallic tin, catalyst on a high surface area support at elevated temperatures. This reaction is further characterized in that it can be carried out over an extended period of time with essentially no catalyst aging. Furthermore, in using my process the waste disposal problem of the caustic process is eliminated.

The process of my invention can be used to condense a wide variety of aldehyde, ketone and mixed carbonyl feeds and is general for those carbonyl compounds which are known in the art to be capable of undergoing condensation. Carbonyl compounds containing from two to 20 carbon atoms are particularly desirable for condensation according to my process, however, even higher molecular weight carbonyl compounds can be used. As pointed out, at least one of the carbonyl compounds in the feed to my process must contain an alpha hydrogen atom. It can be of the general formula:

where R and $R_1$ can be the same or different and are selected from the group consisting of hydrogen, alkyl, alkylene, cycloalkyl, aryl, alkaryl, and aralkyl groups and may contain substituents such as halogen which do not interfere with the condensation reaction. The group $R_2$ can be hydrogen or any of the groups listed above for R to the extent that steric hinderance does not substantially interfere with the availability of the alpha hydrogen atom for the condensation reaction. For example, when both R and $R_2$ are phenyl groups, such as in diphenylacetaldehyde, it will not readily self-condense; however, it will readily condense with another carbonyl compound having an available alpha hydrogen atom, such as acetaldehyde. Also, alpha, beta unsaturated compounds which have an alpha hydrogen atom, such as acrolein and crotonaldehyde, will not readily self-condense, since the alpha hydrogen atom at the double bond is quite unreactive; however, these compounds will also readily condense with another carbonyl compound having an available alpha hydrogen. The cyclic ketones and the polycarbonyl ketones and aldehydes which contain at least one alpha hydrogen atom can also serve as the hydrogen donor reactant in my process.

Although it is generally desired to self-condense one molecular species, it is also possible to condense different molecular species, that is, an aldehyde with a different aldehyde, an aldehyde with a ketone or a ketone with a different ketone. When more than one molecular species of reactant is utilized, a mixture of products is usually produced. The proportion of each species of reactant utilized and their relative reactivities for the condensation reaction control the product distribution. One alpha hydrogen on a carbon atom is the most reactive, two alpha hydrogen atoms on a carbon atom are of intermediate reactivity and three alpha hydrogen atoms on a carbon atom are the least reactive. For example, methylethylketone condenses to 3,4-dimethyl-3-hexen-2-one as the main product. In the condensation of a mixture of acetaldehyde and propionaldehyde, the predominant product after dehydration according to this scale of reactivity is a mixture of 2-methylbutenal and 2-methylpentenal and less predominant are 2-butenal and 2-pentenal. By using the less reactive species in excess, that is the acetaldehyde, the reaction can be directed to produce 2-methylbutenal. In like manner acetone and propionaldehyde condense predominately to 2,3-dimethyl-2-butenal in an excess of acetone.

Among carbonyl compounds having an available alpha hydrogen atom which may be used as the feed either alone or admixed with one or more other carbonyl compounds are acetaldehyde, propionaldehyde, n-butyraldehyde, isobutyraldehyde, n-valeraldehyde, isovaleraldehyde, n-capronaldehyde, n-caprylaldehyde, n-caprinaldehyde, n-lauralaldehyde, n-tridecanal, n-palmitaldehyde, n-stearaldehyde, n-eicosylaldehyde, β-ethylcapronaldehyde, β-hexenylaldehyde, cyclohexylacetaldehyde, cyclohexenylacetaldehyde, β-cyclohexylpropionaldehyde, phenylacetaldehyde, p-tolylacetaldehyde xylylacetaldehyde, formylacetaldehyde, etc. Also included in this group of carbonyl compounds which can be used as a reactant in my process are acetone, methylethylketone, methylisobutylketone, methylisoamylketone, methyl n-hexylketone, methyl n-decylketone, cyclohexanone, cyclohexenone, cyclopentanone, 2-ketotetralin, 1,4-cyclohexyldione, acetylacetone, diacetyl, etc. Additionally, carbonyl compounds without an alpha hydrogen atom, such as formaldehyde, dimethyl propanal, benzaldehyde, chloral, phosgene, glyoxal, etc. may be condensed with carbonyl compounds containing at least one alpha hydrogen atom. Thus formaldehyde and acetaldehyde form acrolein after dehydration, while benzaldehyde forms cinnamaldehyde with acetaldehyde after dehydration, and glyoxal and acetaldehyde form 2-buten-1,4-diol as a main product after dehydration.

The catalyst required for the process of this invention is tin on a high surface area support. The preferred catalyst is metallic tin in the beta form as identified by X-ray diffraction analysis, on a high surface area support. The catalyst can be produced by precipitating a tin compound onto a solid support of high surface area, or by impregnating the support with a tin compound, drying and calcining the tin support containing the precipitated tin compound to produce tin oxide and, when desired, reducing the tin oxide to metallic tin at an elevated temperature. Any tin compound which is soluble in the treating solution, preferably water, may be used for the impregnating solution, such as stannic chloride, stannic bromide, organotin compounds such as stannous acetate, stannous oxalate, dicyclopentadienyl tin (II), etc. When stannous chloride is added to water, it forms a finely dispersed white precipitate, probably $Sn(OH)Cl.XH_2O$, which is absorbed by the support, such as silica gel. When tin metal is added to aqueous nitric acid a white dispersion, probably the double salt $SnO.Sn(NO_3)_2$ is formed which is also suitable for impregnation of the support. A suitable organic solvent, such as dimethylformamide or dimethylsulfoxide can be used for the treating solution for the organotin compounds.

Any suitable reducing gas may be used to reduce the tin oxide to metallic tin. Hydrogen gas is the preferred reductant. However, the lower paraffins are also useful herein. The temperature of reduction is not critical. Since the reduction involves a time-temperature relationship, the temperature must be sufficiently high and the time sufficiently long to obtain substantial reduction to the tin metal. For example, it has been ascertained that reduction of tin oxide, $SnO_2$, on silica gel for six hours at 375° C. results in substantially complete reduction to metallic tin to the beta form while it only takes four hours at 500° C. for the equivalent result, both reduced with hydrogen passing over at a gas hourly space velocity of 150 to 200. Reduction of the tin oxide to metallic tin can take place at a temperature as low as about 250° C. provided that the reduction time is sufficiently long.

It is preferred to use a support which has a surface area of at least 50 $M^2/g$. in order to obtain sufficient activity for economical utility. Supports containing a surface area of at least 100 $M^2/g$. are more preferred while those containing at least 250 $M^2/g$. are the most preferred for this condensation reaction. The support can be silica gel, sodium treated silica gel, sodium silicates, zeolites, aluminas, silica alumina, kieselguhr, bauxite, etc. The tin can be incorporated in the support either before or after it has been calcined. Catalysts containing from about one up to about 75 weight percent, preferably up to about 40 weight percent, tin metal will catalyze the condensation reaction with better yields of the condensed product being obtained with catalysts containing from about five to 20 weight percent tin, and the best yields with catalysts containing from about 10 to 15 weight percent tin.

The temperature at which the condensation reaction is conducted falls within the broad range of about 100° to about 375° C. with the preferred temperature range being about 200° to about 300° C. At the lower temperatures the reaction speed is slow while too high a temperature is avoided to prevent undesired reactions. The reaction, furthermore, is conducted at a temperature at which the reactant and product are stable. For example, acetaldehyde begins to decompose at about 250° C. The pressure used in the reaction may be from subatmospheric to about 200 atmospheres. The preferred pressure range is one to about 75 atmospheres. The most preferred pressure is atmospheric pressure in an open system while in the case of a closed system it is the autogenous pressure. As is apparent from the temperature and pressure ranges and the class of carbonyl compounds suitable as feed, the carbonyl compound may exist either in the gas or the liquid phase during the reaction. That is, reducing the reactant molecular weight, increasing the temperature and decreasing the pressure all favor the gas phase reaction. The opposite favors a liquid phase reaction. When the reaction is carried out in the gas phase, a diluent is not necessary but is preferred to promote the reaction. The preferred diluent is hydrogen since it will assist in maintaining the catalyst in the reduced state. The inert paraffins such as methane and ethane will also accomplish this function. If there is unreduced tin, i.e. tin oxide, present at the initiation of the condensation reaction, the presence of the reducing atmosphere will tend to reduce it during the course of the reaction, particularly at the higher end of the reaction temperature range; however, the presence of some unreduced tin is not detrimental to the condensation reaction. Additionally nonreducing inert gases such as nitrogen and helium may be used as the diluent gas. When a diluent gas is used, it is used in a ratio of up to about 100 mols per mol of carbonyl compound and more preferably in the range of about 0.25 to about 10 mols per mol of carbonyl compound.

As expected, the space velocity (LHSV), i.e. reaction time, is a factor in the gas phase reaction. As space velocity at a given reaction temperature and pressure is decreased, i.e. contact time increased, the selectivity to the condensed structure gradually decreases and the conversion of the feed material increases until a rapid increase in conversion with a corresponding decrease in selectivity occurs at very low space velocities resulting from substantial cracking of the hydrocarbon compounds with considerable tar formation. The space velocity (LHSV) preferably ranges from about 0.3 to about 3 with the most preferred range being about 0.5 to about 1.5. When either the temperature or pressure of reaction is increased, the operable space velocity shifts to a higher range since increasing temperatures and pressures enhance the reaction. It is readily apparent that for a given reactant stream, the temperature, pressure and space velocity must be properly correlated to obtain the optimum desired results.

When the reactant carbonyl compound is in the liquid form at the reaction conditions, it is not necessary to use a diluent. However, it is desirable to pressure the reactor with hydrogen to insure that a significant amount of the tin is maintained in its reduced state. Also any inert paraffin such as methane, ethane, hexane, etc. may be used as a diluent in the liquid phase reaction. In the case of the liquid phase reaction the process may be a batch, semi-continuous or continuous process. In a batch reaction the preferred temperature range is between about 100° and about 250° C. with the time of reaction or holding time varying between one and eight hours. The temperature and time are related in that the holding time is shorter at higher temperatures and longer at the lower temperatures to obtain suitable results.

The following examples are illustrative of my invention and are set forth without any intention of limiting the invention.

EXAMPLE 1

Ten grams of stannous chloride, $SnCl_2.2H_2O$, was added to 50 cc. of water with stirring, resulting in a finely divided white dispersion. This dispersion was completely absorbed by 50 grams of a commercial grade silica gel having a BET surface area of 260 square meters per gram to the point of incipient wetness. This impregnated silica gel was airdried in an oven at 110° C. for 16 hours forming stannic oxide on the silica gel and then calcined at 500° C. for 16 hours. This calcined product contained sufficient tin oxide to produce a 10 percent by weight metallic tin-silica catalyst after complete reduction of the tin oxide to metallic tin.

EXAMPLE 2

A series of six gram (15 cc.) samples of the product of Example 1 were reduced with hydrogen at 375° C. for the periods of time set forth in Table 1 in an externally heated reactor constructed of 20 mm. O.D. Pyrex glass tubing 50 cm. long, with a porous glass disc positioned midway in the reactor as a support for the catalyst bed. The temperature of the reactor was lowered to 250° C. after each sample of catalyst had been reduced for the desired period of time. Reactant n-butyraldehyde was vaporized in a flash zone before being carried over the catayslt in a stream of hydrogen at a hydrogen to n-butyraldehyde molar ratio of about 1.25. The n-butyraldehyde was passed over the catalyst at a liquid hourly space velocity of 0.5 and the hydrogen at a gas hourly space velocity of 160. The reactor was operated at atmospheric pressure. Table 1 sets forth the effect of catalyst reduction time on catalyst activity showing the total conversion of the n-butyraldehyde and the selectivity to 2-ethyl-2-hexenal.

TABLE 1

| | Conversion, percent | Selectivity, percent |
|---|---|---|
| Catalyst reduction times, hours: | | |
| 0 | 9 | 64 |
| 1 | 39 | 81 |
| 2 | 49 | 88 |
| 3 | 55 | 93 |
| 4 | 59 | 96 |
| 6 | 64 | 97 |
| 8 | 65 | 97 |

This experiment, verified by X-ray analysis of the catalyst, reveals that the yield of 2-ethyl-2-hexenal from n-butyraldehyde is in part dependent upon the amount of metallic tin in the catalyst. After the six hour reduction, all of the tin is in the $\beta$-metallic phase according to X-ray diffraction analysis. All of the catalysts that were reduced from one to five hours contained a mixture of $SnO_2$ and $\beta$-Sn as verified by X-ray studies.

EXAMPLE 3

Another series of runs were made with n-butyraldehyde at conditions identical to those in Example 2 using a catalyst reduced for 6 hours at 350° C., except that the space velocity of the feed stream was varied. The results are listed in Table 2.

TABLE 2

| | Conversion, percent | Selectivity, percent |
|---|---|---|
| LHSV, Feed Stream: | | |
| 0.2 | 72 | 59 |
| 0.5 | 64 | 97 |
| 1.2 | 51 | 97 |
| 2.5 | 44 | 97.5 |
| 5.0 | 36 | 99 |

This experiment shows that total conversion increases significantly with a decrease in the overall space velocity of the feed stream with only a slight decrease in selectivity to 2-ethyl-2-hexenal until a very low space velocity resulted in a substantial decrease in the reaction selectivity. This substantial decrease in selectivity was accompanied with considerable tar formation in the reactor.

EXAMPLE 4

A series of catalysts were prepared in the manner set forth in Example 1 and reduced for six hours at 375° C. such that the only variable was the concentration of tin on the catalyst. Each catalyst was used in the condensation of n-butyraldehyde at a temperature of 250° C., a pressure of one atmosphere and a reactor gas liquid hourly space velocity of 0.5/hr. The results of these runs are set forth in Table 3.

TABLE 3

| | Conversion, percent | Selectivity, percent |
|---|---|---|
| Weight percent tin: | | |
| 0 | 12 | 91 |
| 1 | 42 | 91.5 |
| 5 | 54 | 94 |
| 10 | 64 | 97 |
| 15 | 60 | 94.5 |
| 20 | 60 | 93 |
| 40 | 54 | 79 |

From this experiment it is apparent that the amount of tin on the catalyst is not critical over a broad range of operation. At very low amounts the poor conversion is the result of insufficient tin available for catalysis while the poorer results obtained with large amounts of tin are believed to be caused in part by a reduction in the surface area of the catalyst as the result of the large amount of tin present on the surface.

EXAMPLE 5

A six gram (15 cc.) sample of a 10 percent tin on silica catalyst was reduced with hydrogen for three hours at 375° C. in the same reactor as used in Example 2. The reactor temperature was reduced to 300° C. and a mixture of acetone and hydrogen was passed over the catalyst at a liquid hourly space velocity for the acetone of 1.0 and a gas hourly space velocity of 160 for the hydrogen. The total pressure was one atmosphere. A 14 percent conversion of the acetone resulted with a selectivity of 70 percent to mesityl oxide.

EXAMPLE 6

A six gram sample of an unreduced 10 percent tin-on-silica catalyst was introduced into the same reactor as used in the preceding example and reduced in a hydrogen gas stream for six hours at 375° C. A series of reactions were conducted over a range of temperatures using a 1 to 1.5 molar mixture of acetaldehyde and hydrogen at a liquid hourly space velocity of 0.5 at an overall pressure of one atmosphere. Table 4 sets forth the total conversion of acetaldehyde and the selectivity to crotonaldehyde.

TABLE 4

| | Conversion, percent | Selectivity, percent |
|---|---|---|
| Temperature, ° C: | | |
| 200 | 26 | 85 |
| 250 | 48 | 78 |
| 300 | 72 | 30 |
| 350 | 96 | |

EXAMPLE 7

The preceding example was repeated at 200° and 250° C. as the liquid hourly space velocity of the reaction gas mixture was varied. Table 5 sets forth the results of these runs.

TABLE 5

| | LHSV | Conversion, percent | Selectivity, percent |
|---|---|---|---|
| Temperature, ° C.: | | | |
| 200 | 0.1 | 55 | 42 |
| 200 | 0.25 | 44 | 75 |
| 200 | 0.5 | 26 | 85 |
| 250 | 0.1 | 70 | 32 |
| 250 | 0.25 | 60 | 50 |
| 250 | 0.5 | 48 | 78 |

These and other experiments show that the selectivity to the desired condensation product increases and the total conversion decreases when either the contact time of the reaction gas with the catalyst or the reaction temperature is reduced. Optimum operating conditions must be selected based on a balance of all economic factors present with respect to each specific reaction system.

EXAMPLE 8

A catalyst was prepared by impregnating 10 to 20 mesh silica (216.4 square meter per gram) with an aqueous dispersion prepared from stannous chloride ($SnCl_2 \cdot 2H_2O$) to the point of incipient wetness. The impregnated silica was dried and calcined in air at 500° C. for 16 hours. Sufficient tin was in the impregnating solution so that the final catalyst contained about 10 weight percent tin as stannic oxide.

Vaporized cyclohexanone was passed through a bed of the above catalyst at 375° C. and atmospheric pressure for two hours at a liquid hourly space velocity of 0.6. The cyclohexanone was passed downflow through the bed of catalyst in a stream of hydrogen carrier gas. At the end of the first hour the conversion was 25.8 percent with a selectivity to 2-(1-cyclohexenyl)cyclohexanone (containing about 5 percent of 2-cyclohexylidenecyclohxeanone) of 67 percent while at the end of two hours the conversion was 23.5 percent with a selectivity of 84 percent.

EXAMPLE 9

Cyclohexanone admixed with hydrogen was passed over a 10 percent tin-on-silica catalyst as produced in Example 1, and reduced in hydrogen at 375° C. for six hours, at a liquid hourly space velocity of 1.0 for the cyclohexanone and a gas hourly space velocity of 160 for the hydrogen. The reaction temperature was 250° C. and the pressure one atmosphere. A 27.5 percent conversion of the cyclohexanone with 94 percent selectivity to 2-(1-cyclohexenyl)cyclohexanone resulted.

This reaction and the preceding reactions illustrate an interesting aspect of the invention—the fact that the condensation of cyclic ketones is accompilshed with substantially equal facility with either the reduced or the non-reduced tin catalyst while the condensation of carbonyl compounds having the carbonyl group in a straight chain is greatly facilitated when the tin is reduced to the metallic form as illustrated in Example 2. However, as already pointed out, the presence of a reducing atmosphere at a sufficiently high reaction temperature will tend to reduce any tin oxide present in the catalyst to metallic tin.

EXAMPLE 10

Six grams of a 10 percent tin-silica catalyst was reduced for six hours at 375° C. and then put into a 500 cc. autoclave. To the autoclave was charged 50 cc. of butyraldehyde and hydrogen was added to a total pressure of 50 p.s.i.g. The temperature was raised to 200° C. and held for two hours. Approximately 40 percent of the butyraldehyde was converted to 2-ethyl hexenal with a selectivity of approximately 95 percent in a liquid phase condensation reaction.

In addition to the specific reactions described above the following reactions are illustrative of the invention: n-capryaldehyde condenses to 2-hexyl-2-decanal; n-lauralaldehyde condenses to 2-decyl-2-tetradecenal; n-eicosylaldehyde condenses to 2-octadecyl-2-docosenal; 3-butenal condenses to 2-vinyl-2,5-hexadienal; cyclopentanone condenses to 2-(1-cyclopentyl)cyclopentanone; 4-chlorobutyraldehyde condenses to 2-chloroethyl-6-chlorohexenal; methylphenylketone condenses to 1,3-diphenyl-2-buten-1-one; and methylcyclohexyl ketone condenses to 1,3-dicyclohexyl-2-buten-1-one. Furthermore, phenylacetaldehyde condenses to 2,4-diphenyl-2-butenal; cyclohexylacetaldehyde condenses to 2,4-dicyclohexyl-2-butenal; p-tolylacetaldehyde condenses to 2,4-di-p-tolyl-2-butenal; β-(2,4-dichlorophenyl)propanal condenses to 2-(2,4-dichlorophenylmethyl)-5-(2,4-dichlorophenyl)-2-pentanal; etc.

As evident from the exemplification above, R, $R_1$ and $R_2$ of the general formula for the carbonyl compound can be hydrogen, alkyl of 1–18 carbon atoms which may be substituted by up to 2 chlorine atoms, alkylene of 3–6 carbon atoms, cycloalkyl of 5–9 carbon atoms, aryl of 6–10 carbon atoms which may be substituted by up to 2 chlorine atoms and aralkyl of 7–8 carbon atoms.

In preparing the catalyst the tin-containing compound is deposited or impregnated on the support and the impregnated support dried and preferably calcined in an oxygen containing atmosphere such as air resulting in the conversion of the tin compound to stannic oxide. This tin oxide-support can then be subjected to reduction, as described, with the production of metallic tin on the support. However, in some instances, the impregnated support can conveniently be dried and then be immediately subjected to reduction conditions without the intermediate formation of tin oxide. Reduction is undertaken at a temperature-time relationship as will conveniently produce the desired result, however, a temperature of about 550° C., preferably about 500° C., should not be exceeded to avoid vaporizing or sintering the tin.

Additional large scale runs have been carried out in accordance with the conditions described herein for long periods of operation at high selectivities and yields with essentially no catalyst aging. If a catalyst loses activity, which may result from impurities in the feed stream or from carbon deposits at higher temperatures of operation, the catalyst can readily be regenerated to essentially its original activity by burning off the deposits in air at an elevated temperature, e.g. 500° C., followed by reduction in the same manner as with the fresh catalyst.

It is to be understood that the above disclosure is by way of specific example and that numerous modifications and variations are available to those of ordinary skill in the art without departing from the true spirit and scope of my invention.

I claim:

1. In the aldol condensation process for condensing carbonyl compounds the improvement which comprises contacting at least one condensable carbonyl compound having from 2 to 20 carbon atoms and of the general formula

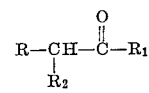

where R, $R_1$ and $R_2$ can be the same or different and are selected from the group consisting of hydrogen, alkyl of 1–18 carbon atoms which may be substituted by up to 2 chlorine atoms, alkylene of 3–6 carbon atoms, cycloalkyl of 5–9 carbon atoms, aryl of 6–10 carbon atoms which may be substituted by up to 2 chlorine atoms, aralkyl of 7–8 carbon atoms, cyclohexanone, cyclohexenone, cyclopentanone, 2-ketotetralin 1,4-cyclohexyldione acetylacetone and diacetyl in the presence of between about 0.25 and 100 mols of hydrogen per mol of said carbonyl compound at a temperature between about 100° C. and about 375° C. with a catalyst comprising metallic tin in the β-form on a support having a surface area of at least about 50 $M^2/g$.

2. A process in accordance with claim 1 in which the carbonyl compound is n-butyraldehyde.

3. A process in accordance with claim 1 in which hydrogen is present in the reaction zone in the amount of between 0.25 and 10 mols per mol of said carbonyl compound.

4. A process in accordance with claim 3 in which the carbonyl compound is n-butyraldehyde.

5. A process in accordance with claim 3 in which the carbonyl compound is in the gas phase.

6. A process in accordance with claim 5 in which the carbonyl compound is n-butyraldehyde.

7. A process in accordance with claim 5 in which the carbonyl compound is acetaldehyde.

8. A process in accordance with claim 7 in which formaldehyde is admixed with the said acetaldehyde.

9. A process in accordance with claim 5 in which the carbonyl compound is acetone.

10. A process in accordance with claim 1 in which the support is silica.

11. A process in accordance with claim 10 in which the carbonyl compound is n-butyraldehyde.

12. A process in accordance with claim 1 in which said temperature is from about 200° C. to about 300° C.

13. A process in accordance with claim 1 in which the support has a surface area of at least about 50 M²/g.

References Cited

UNITED STATES PATENTS

| | | | |
|---|---|---|---|
| 1,914,558 | 6/1933 | Craver | 252—461 |
| 2,129,732 | 9/1938 | Fulton | 252—461 |
| 3,148,218 | 9/1964 | Heimsch | 260—601 |
| 2,393,510 | 1/1946 | Bailey | 260—586 |

FOREIGN PATENTS 1,010,695   11/1965   Great Britain.

OTHER REFERENCES

Sabatier: "Catalysis in Org. Chem.," pp. 239, 240, 296 and 297 (1922).

BERNARD HELFIN, Primary Examiner

N. P. MORGENSTERN, Assistant Examiner

U.S. Cl. X.R.

252—454, 461; 260—590, 593, 598, 599, 601, 638